(12) United States Patent
Calippe et al.

(10) Patent No.: US 8,352,600 B2
(45) Date of Patent: Jan. 8, 2013

(54) SYSTEM AND METHOD FOR DETERMINING A MAXIMUM PACKET DATA UNIT (PDU) PAYLOAD TRANSMISSION SIZE FOR COMMUNICATING IN A MANAGED COMPUTER NETWORK SYSTEM

(75) Inventors: Joël R. Calippe, Sunnyvale, CA (US); Gurudas Somadder, San Jose, CA (US); Thomas V. Flynn, Mountain View, CA (US)

(73) Assignee: Alcatel Lucent, Paris (FR)

( * ) Notice: Subject to any disclaimer, the term of this patent is extended or adjusted under 35 U.S.C. 154(b) by 258 days.

(21) Appl. No.: 12/427,513

(22) Filed: Apr. 21, 2009

(65) Prior Publication Data

US 2010/0268822 A1 Oct. 21, 2010

(51) Int. Cl.
*G06F 15/173* (2006.01)
(52) U.S. Cl. ........................................ 709/225
(58) Field of Classification Search ............... 709/225
See application file for complete search history.

(56) References Cited

U.S. PATENT DOCUMENTS

| | | | |
|---|---|---|---|
| 7,093,008 B2 * | 8/2006 | Agerholm et al. | 709/223 |
| 7,493,376 B1 * | 2/2009 | Pulpatta et al. | 709/220 |
| 7,716,355 B2 * | 5/2010 | McCloghrie et al. | 709/230 |
| 2004/0001444 A1 * | 1/2004 | Sadot et al. | 370/252 |
| 2004/0044758 A1 * | 3/2004 | Palmer et al. | 709/223 |
| 2005/0105508 A1 * | 5/2005 | Saha | 370/352 |
| 2005/0132000 A1 * | 6/2005 | Richardson et al. | 709/204 |
| 2006/0235971 A1 * | 10/2006 | McCloghrie et al. | 709/225 |
| 2007/0171828 A1 * | 7/2007 | Dalal et al. | 370/235 |
| 2009/0003225 A1 * | 1/2009 | Klassen et al. | 370/250 |
| 2010/0011244 A1 * | 1/2010 | Mohamed-Rasheed et al. | 714/18 |

FOREIGN PATENT DOCUMENTS

WO WO 2008080792 A1 * 7/2008

OTHER PUBLICATIONS

Genkiv, Delyan. Algorithm and Testing Software for Avoiding Fragmentation at the Application Layer. CompSysTech '08 Proceedings of the 9th International Conference on Computer Systems and Technologies and Workshop for PhD Students in Computing. 2008. p. 15-1 through 15-5.*
Luckie et al. Inferring and Debugging Path MTU Discovery Failures. Internet Measurement Conference. 2005. pp. 193-198.*

* cited by examiner

*Primary Examiner* — Lynn Feild
*Assistant Examiner* — Bryan Lee
(74) *Attorney, Agent, or Firm* — Kramer & Amado P.C.

(57) ABSTRACT

A system and method for substantially preventing firewall generated communication losses in regard to communications by authorized users in a managed computer network system is provided. The method comprises transmitting one or more status inquiry commands to at least one node in the managed computer network system, wherein the status inquiry command requests a first quantity of objects from the at least one node; receiving a non-zero quantity of objects response from the at least one node; and limiting communications through the firewall in the managed computer network system with the at least one node to a message size substantially equivalent to the received non-zero quantity of objects response from the at least one node, thereby substantially preventing firewall generated communication losses in the managed computer network system.

20 Claims, 4 Drawing Sheets

| ENTRY | OBJECTS/ATTRIBUTES | RETURNED ENTRY SIZE |
|---|---|---|
| 1 | | |
| 2 | | |
| 3 | | |
| 4 | | |
| 5 | | |
| 6 | | |
| 7 | | |
| 8 | | |
| ⋮ | | |
| | | |
| | | |
| N | | |

RETURNED RESULTS POINTER 26 → (at entry 6)

MIB 24

FIG. 4

SYSTEM AND METHOD FOR DETERMINING A MAXIMUM PACKET DATA UNIT (PDU) PAYLOAD TRANSMISSION SIZE FOR COMMUNICATING IN A MANAGED COMPUTER NETWORK SYSTEM

TECHNICAL FIELD

The invention relates to computer network communications. More particularly, the invention relates to a system and method for determining a maximum packet data unit payload size in a Simple Network Management Protocol (SNMP) system.

BACKGROUND

SNMP systems provide relatively easy management of computer network systems. Their advantages have been known for some time, and thus SNMP systems are fairly ubiquitous in the network industry Another ubiquitous component in computer networks is firewalls. Firewalls, as those of ordinary skill can attest, are very important in protecting the integrity and safety of both the physical components, and the data contained therein. Notwithstanding their significance, however, firewalls can add a level of complexity to communications between those outside the firewall, and those inside the firewall.

For example, it is well known to those of ordinary skill that certain firewalls will have different policies in regard to Internet Protocol (IP) communications. Some firewalls will have no drop policies, and in some cases, the firewalls will have a drop policy such that IP packet fragmentation is not allowed, as Denial of Service attacks commonly use fragmented packets. In the former, with no fragmentation drop policy, there should be no missed communications, or lost messages. Thus, for example, if an SNMP GetRequest is sent to a managed node across a firewall, and if the SNMP response to the GetRequest is greater than the allowed maximum transmission unit (MTU) that intermediate routers are allowing, then the packet will become fragmented before being forwarded to the next hop. If there are no drop policies, then the fragmented parts of the original SNMP response will be forwarded through the firewall to the SNMP manager.

However, if the firewall does have a drop policy, such that fragmented packets are not allowed (i.e., the fragmented packets will not be forwarded), then the packet is silently dropped by the intermediate firewall without notifying the end recipient (i.e., the SNMP manager) of the dropped packets. It's as if there was no response at all; in this case, the SNMP manager is left to wonder whether the original transmission made it to the destination, whether the communication was interrupted in transit, or whether the recipient is not working properly, among other problems.

As discussed above, firewalls are designed to provide protection to the external networks to which they are connected. One example of protection is warding off denial of service (DoS) or distributed denial of service (DDoS) attacks. As its name implies, a DoS is an attempt to make a computer resource or network unavailable to its intended users. There are many different methods for carrying out DoS attacks, but the overall goal is to prevent the computer resource or intended network from functioning properly. The attacks can cause temporary outages, or, in extreme cases, can put systems out of service for extended periods of time. There are, as those of ordinary skill in the art can appreciate, other reasons why a firewall will prevent successful communications between the SNMP manager and the managed nodes/agents.

For example, it is possible that the firewall will prevent communications if JumboFrames (greater than about 1500 octets) are involved, among other reasons.

A common method of attack involves saturating the computer resource or intended network with numerous external communications requests, such that it cannot respond to legitimate traffic, or responds so slowly as to be rendered effectively unavailable. The consequence of these attacks generally forces the computer resource or intended network to reset, which means that it goes "off-line" for a period of time, or it uses so much resources that it cannot respond to legitimate uses, and thus is effectively off-line for the legitimate users. Therefore, providers of firewalls have included in their arsenal of countermeasures DoS defenses that attempt to prevent the takedown of the intended computer resource or network.

However, as those of ordinary skill can attest, legitimate (i.e., non-malicious) users can prompt a DoS defense that thwarts their request for data or communications. For example, if a legitimate user requests data or communicates with firewall protected nodes and exceeds the size limitation, then a DoS defense can be generated, thereby negating a legitimate use of the protected computer resource or network. One example of when this can occur is with the SNMP generated GetRequest; if the response to the legitimate GetRequest exceeds the size limitations for a firewall, then the communication can be effectively lost, although the SNMP manager has no knowledge or understanding of how or why the communication failure occurred.

Therefore, there is a need for a solution that enables proper exchange of SNMP messages when a drop policy is in place on a firewall.

SUMMARY

In light of the present need for enabling proper exchange of SNMP messages when a drop policy is in place on a firewall, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

According to a first aspect of the present invention, a method for substantially preventing firewall generated communication losses in regard to communications by authorized users in a managed computer network system, is provided, the method comprising: transmitting one or more status inquiry commands to at least one node in the managed computer network system, wherein the status inquiry command requests a first quantity of objects from the at least one node; receiving a non-zero quantity of objects response from the at least one node; and limiting communications through the firewall in the managed computer network system with the at least one node to a message size substantially equivalent to the received non-zero quantity of objects response from the at least one node, thereby substantially preventing firewall generated communication losses in the managed computer network system.

According to the first aspect, the step of limiting communications comprises correlating a packet date size to the received non-zero quantity of objects response from the at least one node. According to the first aspect, the method further comprises selecting a master node among a plurality of nodes in the managed computer network system.

Still further according to the first aspect, the step of selecting a master node comprises: specifying a mediation group among the one or more nodes, wherein the mediation group includes at least two nodes; and selecting one of the plurality of nodes of the mediation group as the master node.

According to the first aspect, the managed computer network includes a network manager, the network manager stores a management information base corresponding to the at least one node, the management information base including a plurality of entries, each of the entries including a plurality of objects, the method further comprising: repeating the steps of transmitting and receiving with the at least one node, for each of the plurality of entries; creating a list of received non-zero quantity of objects that corresponds to each entry in the management information base for the at least one node; and modifying communications with the at least one node for each entry according to the corresponding non-zero quantity of objects from the at least one node, thereby substantially preventing firewall generated communication losses in the managed network system.

Still further according to the first aspect, the step of limiting communications through the firewall in the managed computer network system comprises: recording whether a response to the status inquiry command has been received from the at least one node; determining that if a response has been received from the at least one node that the quantity of objects received correlates to a condition of no communication failure; determining that if no response has been received from the master node, a new status inquiry command is to be transmitted to the master node, wherein the new status inquiry command requests a second quantity of objects from the master node, wherein the second quantity of objects is less than the first quantity of objects, and repeating the steps of transmitting new status inquiry commands with a fewer quantity of objects until the quantity of objects received is substantially similar to the quantity of objects requested, wherein the quantity of objects received correlates to a condition of no communication failure.

According to the first aspect, the status inquiry command is selected from the group consisting of a GetRequest command and a GetNextRequest command, and the firewall generated communication loss comprises a firewall denial of service communication loss and the firewall generated communication loss comprises a firewall JumboFrame communication loss.

According to a second aspect of the present invention, a system for substantially preventing firewall generated communication losses in regard to communications by authorized users in a managed computer network system is provided, the system comprising: at least one SNMP managed node; a firewall; and an SNMP network manager configured to transmit one or more status inquiry commands to the at least one SNMP managed node, wherein the status inquiry command requests a first quantity of objects from the at least one SNMP managed node, and receive a non-zero quantity of objects response from the at least one SNMP managed node, and limit communications through the firewall in the managed computer network system with the at least one node to a message size that is substantially equivalent to the received non-zero quantity of objects response from the at least one node, thereby substantially preventing firewall generated communication losses in the managed computer network system.

According to the second aspect, the SNMP network manager is further configured to correlate a packet date size to the received non-zero quantity of objects response from the at least one node.

Still further according to the second aspect, the SNMP network manager is further configured to select a master node among a plurality of nodes in the managed computer network system. According to the second aspect the SNMP network manager is further configured to specify a mediation group among the one or more nodes, wherein the mediation group includes at least two nodes; and the SNMP network manager is further configured to select one of the plurality of nodes of the mediation group as the master node.

Still further according to the second aspect, the managed computer network further comprises: a network manager configured to store a management information base corresponding to the at least one node, and wherein the management information base is configured to store a plurality of entries, each of the entries including a plurality of objects, and wherein the SNMP network manager is configured to repeat transmitting and receiving with the at least one node, for each of the plurality of entries, the SNMP network manager is configured to create a list of received non-zero quantity of objects that corresponds to each entry in the management information base for the at least one node, and the SNMP network manager is configured to modify communications with the at least one node for each entry according to the corresponding non-zero quantity of objects from the at least one node, thereby substantially preventing firewall generated communication losses in the managed network system.

According to the second aspect, the SNMP manager is configured to record whether a response to the status inquiry command has been received from the at least one node, the SNMP manager is configured to determine that if a response has been received from the at least one node that the quantity of objects received correlates to a condition of no communication failure, and wherein the SNMP manager is configured to determining that if no response has been received from the master node, a new status inquiry command is to be transmitted to the master node, wherein the new status inquiry command requests a second quantity of objects from the master node, wherein the second quantity of objects is less than the first quantity of objects, and wherein the SNMP manager is configured to repeat the steps of transmitting new status inquiry commands with a fewer quantity of objects until the quantity of objects received is substantially similar to the quantity of objects requested, wherein the quantity of objects received correlates to a condition of no communication failure.

According to the second aspect, the status inquiry command is selected from the group consisting of a GetRequest command and a GetNextRequest command. Still further, according to the second aspect the firewall generated communication loss comprises a firewall denial of service communication loss, and the firewall generated communication loss comprises a firewall JumboFrame communication loss.

According to a third aspect of the present invention a computer readable medium including a program for substantially preventing firewall generated communication losses in regard to communications by authorized users in a managed computer network system is provided comprising: computer program code that transmits one or more status inquiry commands to at least one node in the managed computer network system, wherein the status inquiry command requests a first quantity of objects from the at least one node; computer program code that receives a non-zero quantity of objects response from the at least one node; and computer program code that limits communications through the firewall in the managed computer network system with the at least one node to a message size that is substantially equivalent to the received non-zero quantity of objects response from the at least one node, thereby substantially preventing firewall generated communication losses in the managed computer network system.

According to a fourth aspect of the present invention an SNMP managed computer network system for substantially preventing firewall generated communication losses in regard to communications by authorized users in the SNMP managed computer network system is provided, the system comprising: at least one SNMP managed node; a firewall; and an SNMP network manager configured to transmit one or more status inquiry commands to the at least one SNMP managed node, wherein the status inquiry command requests a first quantity of objects from the at least one SNMP managed node, and receive a non-zero quantity of objects response from the at least one SNMP managed node, and limit communications through the firewall in the managed computer network system with the at least one node to a message size that is substantially equivalent to the received non-zero quantity of objects response from the at least one node, thereby substantially preventing firewall generated communication losses in the managed computer network system.

BRIEF DESCRIPTION OF THE DRAWINGS

The novel features and advantages of the present invention will best be understood by reference to the detailed description of the preferred embodiments that follows, when read in conjunction with the accompanying drawings, in which:

FIG. 4 is a simplified block diagram of a plurality of management information bases (MIBs) that are used by the SNMP manager as shown in FIG. 1.

DETAILED DESCRIPTION

Figure 1:
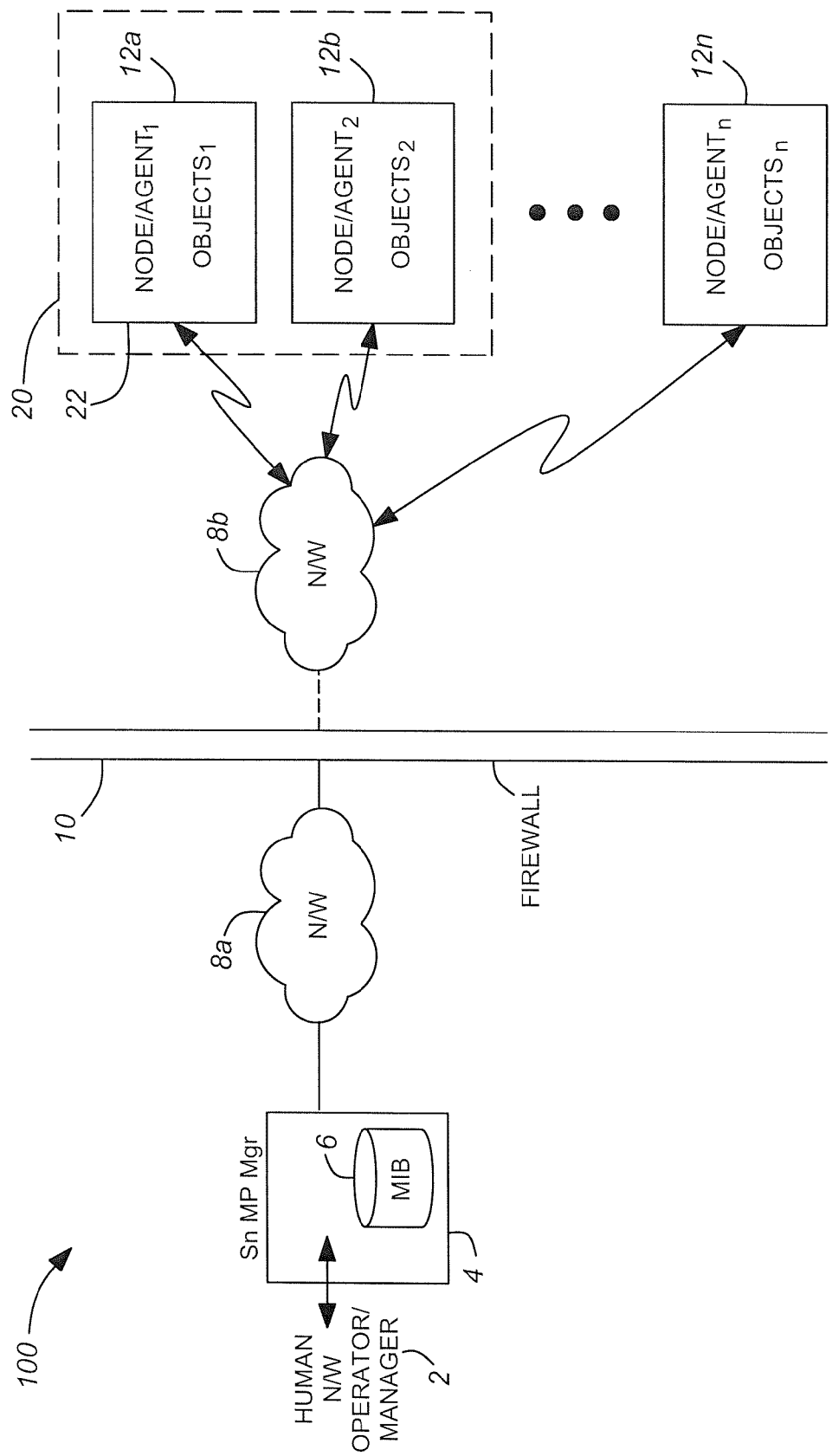
FIG. 1 is a schematic diagram of an exemplary SNMP managed network including a network element configured to determine a maximum transfer unit size of packet data according to an exemplary embodiment of the invention.

The various features of the preferred embodiments will now be described with reference to the drawing figures, in which like parts are identified with the same reference characters. The following description of the presently contemplated best mode of practicing the invention is not to be taken in a limiting sense, but is provided merely for the purpose of describing the general principles of the invention.

A system and method are provided for improving communications through a firewall in an SNMP managed network system by substantially preventing different types of firewall generated communication failures in the firewall of the SNMP managed network system, including DoS, JumboFrame and other types and reasons for generating communication losses in or through the firewall. In order to determine the number of objects that can be requested and received through the firewall from a managed node, without causing a DoS communication failure, a series of SNMP GetRequest commands are transmitted to a selected managed node in the network. As those of ordinary skill can appreciate, such a series of GetRequest commands can be time consuming, and thus can impair system performance. Thus, according to an exemplary embodiment, a series of GetRequest commands are only transmitted to one or more nodes in the SNMP managed computer network system. According to a preferred embodiment, a series of GetRequest commands are transmitted to a single representative node in the SNMP managed computer network system.

Following transmission of the GetRequest commands, a determination is made as to whether a responsive communication has been received. If a responsive communication has been received, then the SNMP management system has established the number of objects the SNMP managed communication system and the firewall that will not cause or initiate a DoS communication failure by the firewall. If, however, no response is received, the SNMP manager applies a correcting factor to determine a new number of objects to request in the GetRequest, so that a fewer amount of objects are requested. The process of requesting smaller and smaller numbers of objects is iteratively applied until a successful receipt is made of the data requested. When a successful receipt is obtained, the SNMP manager knows that it has determined a number of objects that can be requested and received through the firewall and not cause or initiate a DoS communication failure, and all other future requests for those objects can be modified to fall within the now known number of objects for the SNMP managed communication system. The number of objects that has been determined by the SNMP manager to not cause or initiate a DoS communication failure by the firewall can be used to determine a packet data size that also substantially prevents DoS communication failures by the firewall.

FIG. 1 is a schematic diagram of an exemplary SNMP managed network (network) 100 according to an exemplary embodiment.

As known to those of ordinary skill, and referring now to FIG. 1, an SNMP-based network comprises a management system, a network protocol (SNMP), and managed elements/devices. The management system includes an SNMP manager, and a database of management information (usually referred to as a "management information base" (MIB)). The managed element/device (the managed element/device can also be referred to as a "node") includes the physical device that the human operator(s) want to control and/or monitor, an SNMP agent, and an MIB unique to the managed device. The SNMP manager provides the interface between the human network manager/operator and the management system. The SNMP agent provides the interface between the manager and the physical device(s) being managed. The physical devices can include routers (see FIG. 1), switches, access servers, hubs, IP telephones, computer hosts, and printers, among other devices.

The SNMP manager and its agent(s) use the MIB and a relatively small set of commands to exchange information. The SNMP MIB is organized into a tree structure with individual variables, such as point status or description, being represented as leaves on the branches. A long numeric tag or object identifier (OID) is used to distinguish each variable uniquely in the MIB and in SNMP messages. Each data set is therefore referred to as an "object".

There are generally only five basic messages used in an SNMP network management system to communicate between the SNMP manager and the SNMP agent (hereon in referred to as the "manager" and the "agent"). The GetRequest and GetNextRequest commands allow the manager to request information for a specific variable/object. The agent, upon receiving a GetRequest or GetNextRequest command, will issue a GetResponse message to the manager with either the information requested, or an error indication as to why the request cannot be processed. A Set message allows the manager to request a change be made to the value of a specific variable in the case of an alarm remote that will operate a relay. The agent will then respond with a GetResponse message indicating the change has been made or an error indication as to why the change cannot be made. The SNMP Trap message allows the agent to spontaneously inform the SNMP manager of an "important" event.

Network 100 includes SNMP manager 4, which is configured to determine a number of objects that can be requested and successfully received from a managed node 12 through a firewall 10 without causing or initiating a DoS communication failure by firewall 10 according to an exemplary embodiment. Included in network 100 are first network 8a, firewall 10, second network 8b, and node/agents 12a, and nodes/agents 12b through 12n (hereinafter referred to as nodes 12a-n). As those of ordinary skill in the art can appreciate, networks 8a, b can be any type of network, including but not limited to a local area network (LAN), a wide area network (WAN), any type of wireless network, using any one or more different communication standards.

SNMP manager 4 further comprises management information base (MIB) 6, which is a database of information regarding nodes 12a-n that are part of SNMP managed network 100. SNMP manager 4 provides the interface between a human network manager/operator 2 and network 100 and nodes 12a-n. As known to those of ordinary skill in the art, MIB 6 includes a plurality of entries and each entry includes a plurality of object, which in general represent status or other types of information about the managed node 12 to which MIB 6 refers. The GetRequest and GetNextRequest are used to obtain one or more objects per entry of MIB 6.

SNMP manager 4 is preferably implemented by the use of one or more machines that comprise hardware and/or machine readable instruction encoded on a machine readable medium, such as, for example, an Alcatel-Lucent 5620 SAM. Firewall 10 can be implemented by the use of one or more machines that comprise hardware and/or machine readable instructions encoded on a machine readable medium, or as software code or program(s) that is(are) contained within a single or multiple machines capable of reading the machine readable medium. SNMP manager 4, firewall 10, and node(s) 12a-12n can further include a microprocessor. The microprocessor can be any type of processor, such as, for example, any type of general purpose microprocessor or microcontroller, a digital signal processing (DSP) processor, an application-specific integrated circuit (ASIC), a programmable read-only memory (PROM), or any combination thereof. Either or both of SNMP manager 4, and nodes 12a-n can use its microprocessor to read a computer-readable medium containing software, and SNMP 4 can use its microprocessor(s) to read a computer readable medium that contains software that includes instructions for carrying out one or more of the functions of SNMP 4, as further described below.

As discussed above, a problem exists with SNMP managed networks 100 that have firewalls 10 that limit packet data size: there is no real way of determining if a non-response to the SNMP GetRequest or GetNextRequest command is the result of problems in communicating with the target node(s) 12a-n, or whether firewall 10 is dropping packets that have become fragmented as a result of its fragmentation/drop policy (i.e., a DoS policy, a JumboFrame prevent policy, among others). According to a first embodiment, a first method of solving this problem is to guess the maximum size of objects allowed through SNMP managed network 100 and ensure that none of the SNMP requests from SNMP manager 4 or the resulting SNMP responses from nodes 12a-n will exceed the maximum number of objects allowed to avoid packet fragmentation and subsequent DoS communication losses. In this manner, SNMP manager 4 provides up-front fragmentation at the network manager level. The method of making a guess as to the maximum size of the number of objects as described above, will ensure, to some extent, that communications of GetRequest and GetNextRequest commands (and their subsequent responses) will proceed more expeditiously than if no attempt is made to establish a maximum number of objects.

Figure 2:
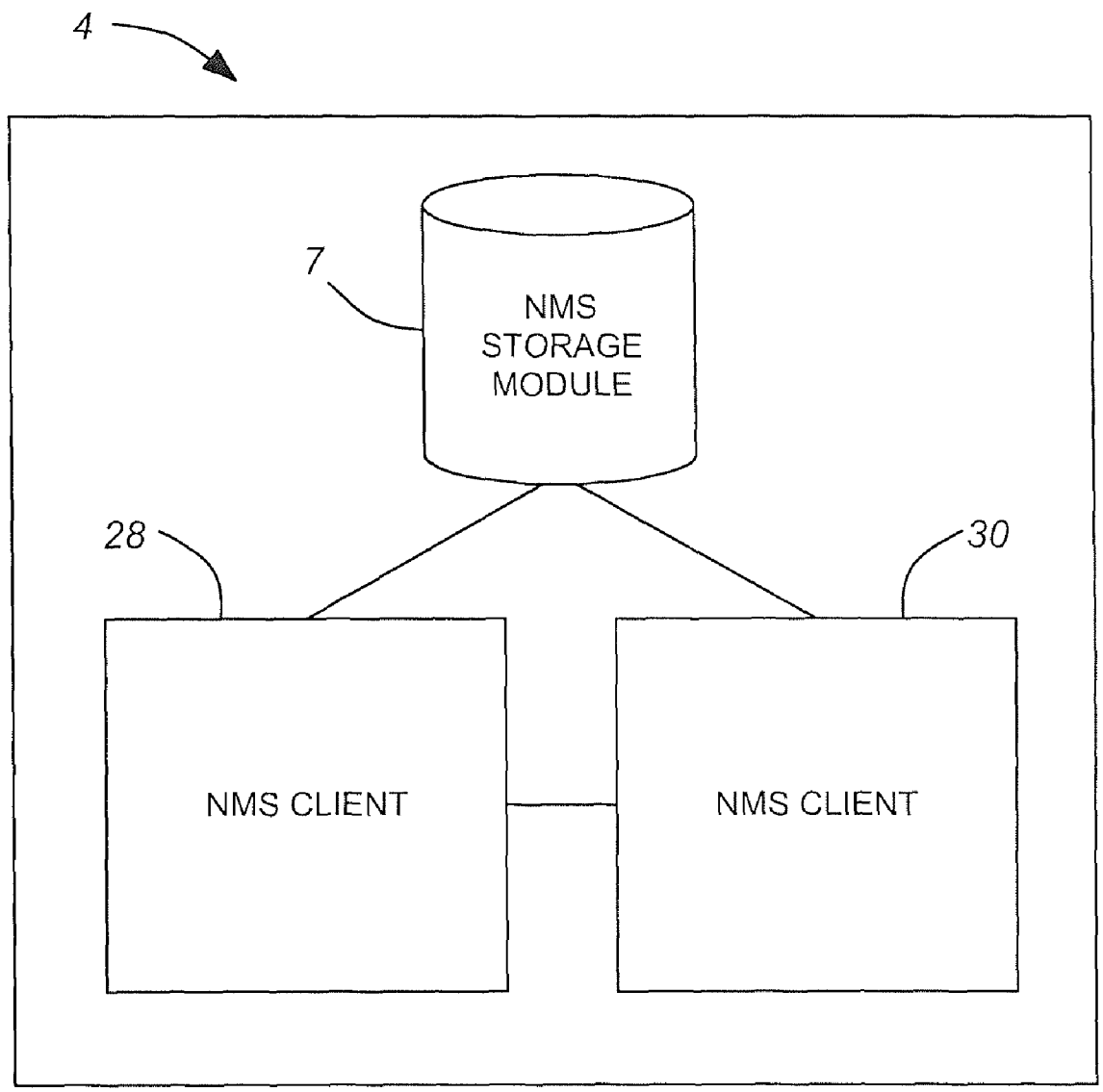
FIG. 2 is a schematic diagram of an exemplary network management system for use in the network of FIG. 1.

FIG. 2 is a schematic diagram of an exemplary network management system (NMS) 4 for use in network 10 of FIG. 1. In particular, NMS 4 can include NMS storage module 7, NMS client 28, and NMS server 30.

NMS storage module 7 can be a machine-readable medium that stores information representing the topology of a network and the status of the network nodes contained within network 10. Storage module 7 can, for example, store MIB 6. Other suitable information for storage in storage module 7 will be apparent to those of ordinary skill in the art.

NMS client 28 can be a combination of hardware and/or machine-executable instructions encoded on a machine-readable memory configured to manage the interaction of an operator with NMS 4. NMS client 28 can further include input devices, such as a keyboard, and output devices, such as a monitor. NMS client 28 can be configured to display a graphical user interface (GUI) to an operator, the GUI detailing the network topology, alarms raised in network 10, and similar information.

NMS server 30 can be a combination of hardware and/or machine-executable instructions encoded on a machine-readable memory configured to implement the functionality of NMS 4. Thus, NMS server 30 can include, for example, a conventional microprocessor, a Field Programmable Gate Array (FPGA), instruction-encoded memory, and any other machine components that will be apparent to those of skill in the art.

Figure 3:
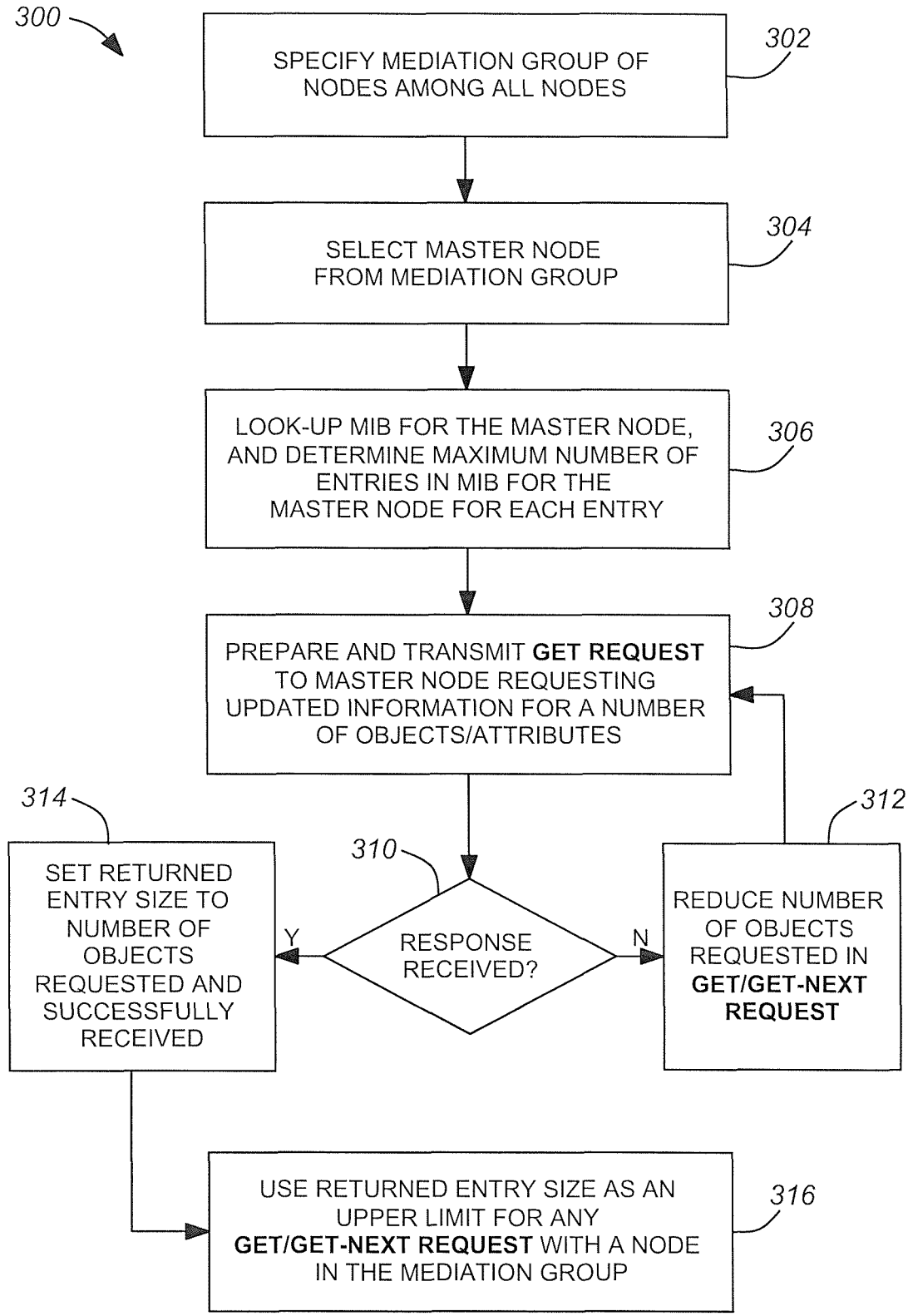
FIGS. 3A and 3B illustrate a flow chart of a method for determining a maximum SNMP payload size in an SNMP managed network according to an exemplary embodiment of the invention.

FIGS. 3A and 3B illustrate a flow chart of method 300 for determining a maximum SNMP payload size in SNMP managed network 100 according to an exemplary embodiment of the invention. Method 300 begins with selection of a sub-group of nodes (step 302) from the entire set of nodes 12a-n that are protected by firewall 10 that drops fragmented packets as part of its denial of service (DoS) protection service. The sub-group of nodes is referred to as mediation group 20.

According to an exemplary embodiment, the selection of a sub-group of nodes (mediation group 20) can be performed by an operator on the basis of those nodes 12a-n that have experienced problems due to firewall 10. Another exemplary embodiment for determining which nodes to select for mediation group 20 is to allow NMS 4 to monitor communications with nodes 12a-n. NMS 4 can then, at a predetermined point of a communication failure rate, select those nodes for inclusion in the sub-group of nodes.

According to a further exemplary embodiment, there can be more than one mediation group 20 for firewall 10. According to a further exemplary embodiment, there can be multiple mediation groups for firewall 10. Further still, if there are multiple firewalls 10a-n, then each firewall 10 can have one or more mediation groups 20. According to a preferred embodiment, each mediation group 20 (if there are more than one) corresponds only to those nodes 12a-n that are protected by the same firewall 10. That is, mediation group 20a encompasses nodes 12a-n that communicate with NMS 4 only through firewall 10a, and mediation group 20a does not include any nodes that may communicate with NMS 4 through any other firewalls.

Mediation group nodes 20 provide NMS 4 with the capability of processing SNMP requests differently from the other nodes 12a-n (nodes 12a-n that are not part of mediation group 20 are exempt from use of method 300, and thus would use the regular mediation mechanism). Mediation group 20 can be identified automatically by NMS 4, or can be first identified by network manager/operator 2, and then can be automatically updated by NMS 4 or manually updated, or updated both manually and automatically.

Following selection of mediation group 20, one node is selected (in step 304) to be master node 22. Master node 22 can be identified automatically, according to a preset group of criteria by SNMP manager 4 (or some other similar type computer/microprocessor), or can be done manually by network operator/manager 2. According to an exemplary embodiment, master node 22 can be chosen arbitrarily by operator/manager 2, or, according to a further exemplary embodiment, master node 22 can be selected by NMS 4.

By way of example, attention is directed to FIG. 1. In FIG. 1, mediation group 20 includes node 12a, and node 12b. Node 12a has been selected to be master node 22. Of course, as those of ordinary skill in the art can appreciate, master node 22 could have been node 12b, and mediation group 20 could have included three, four, or more nodes 12.

In step 306, all of the entries for the MIB of master node 22 are identified, as well as the number of attributes/objects per entry. Each entry can have multiple attributes/objects, and there is one MIB 6 for each node 12. In step 308, method 300 prepares and issues a GetRequest command with the appropriate number of objects requested for the first entry. According to an exemplary embodiment, method 300 can request all of the objects for each of the entries, or, based upon prior experience, method 300 can issue a GetRequest (or GetNextRequest command) with a fewer number of objects for each of the entries within MIB 6. According to a further exemplary embodiment, method 300 can request all, or some of the objects for all, some, or just one entry in MIB 306. In decision step 310, method 300 determines whether data has been received or not. If no data has been received, then method 300 proceeds to step 312 ("No" path from decision step 310), and method 300 reduces the number of objects to be requested in the next GetRequest and/or GetNextRequest command. Method 300 then repeats step 308 with a reduced number of requested objects in the GetRequest and/or GetNextRequest command. Method 300 repeats steps 308, 310, and 312 as necessary until a positive response is received from master node 22 in decision step 310.

Method 300 can reduce the number of requested objects in any one of many different ways. Method 300 can divide the previously requested number of objects in two, or apply some other factor (for example, 90%) to the previously requested value to determine the next amount of objects to request. In this manner, method 300 can quickly determine the amount of objects that can be successfully retrieved without causing packet fragmentation and subsequent loss communication of all received data, due to, for example, a DoS; policy in firewall 10.

As described above, the method steps of method 300 for issuing the GetRequest or GetNextRequest commands is performed in conjunction with master node 22. According to a further exemplary embodiment, the method steps of method 300 for issuing GetRequest or GetNextRequest commands can be performed in conjunction with one or more, or all of nodes 12a-n that are part of network 100.

FIG. 4 is a simplified block diagram of a plurality of entries for MIB 24 that is applicable to master node 22. The block diagram of FIG. 4 is greatly simplified, but illustrates the principle of action that occurs as data is requested from master node 22, and then, if the requested data is received, it is correlated to the particular entry of MIB 24 that it belongs to. In this manner, method 300 can track and verify that the data being received corresponds to the amount of data requested from master node 22 in the previously issued GetRequest and/or GetNextRequest command. A data pointer, returned results pointer 26, is created to keep track and verify the integrity of the returned data from master node 22.

Probing for a particular entry of MIB 24 is complete when the number objects successfully returned matches that in the original or modified GetRequest or GetNextRequest ("Yes" path from decision step 310), and in step 314 the variable ReturnedEntrySize is set to represent the number of objects requested and returned. Method 300 is then repeated for each entry of MIB 24. The numerical value of ReturnedEntrySize can be in percentage (i.e., 90% of entry 1 for MIB 2 was successfully returned), or it can be listed in actual bytes, among other methods.

The value of ReturnedEntrySize will now be used by the mediation layer of SNMP manager 2 (step 316) as a base in the decision of whether to split a future SNMP request into multiple smaller pieces, or keep it intact. The value of ReturnedEntrySize can be correlated to a maximum packet data unit for subsequent communications.

Further, the value of ReturnedEntrySize can be forwarded to each node in mediation group 20 as the maximum packet data unit size so that it can be used to initiate an embedded alarm and notification trap-system that can notify operator 2 that a specific request exceeds the maximum number of objects that will cause or initiate a DoS loss of communication.

Exemplary embodiments can be implemented as a computer program that can be embodied in any computer-readable or machine-readable storage medium for use by or in connection with an instruction execution system, apparatus, or device, such as a computer-based system, processor-containing system, or other system and/or machine that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments are merely illustrative and should not be considered restrictive in any way. The scope of the invention is defined by the appended claims and their equivalents, rather than by the preceding description.

All United States patents and applications, foreign patents, and publications discussed above are hereby incorporated herein by reference in their entireties.

What is claimed is:

1. A method for substantially preventing firewall generated communication losses in regard to communications by authorized users in a managed computer network system, the method comprising:
    transmitting status inquiry commands to a device in the managed computer network system, wherein each status inquiry command requests a first quantity of objects from the device and the managed computer network system has a unique Management Information Base (MIB);
    receiving objects from the device to determine a maximum number of objects that can be successfully retrieved; and
    limiting communications through the firewall in the managed computer network system with the device to the determined maximum number of objects from the device based upon a particular entry in the MIB.

2. The method according to claim 1, wherein the step of limiting communications comprises:
    correlating a packet size to the determined maximum number of objects from the-device.

3. The method according to claim 1, further comprising:
    selecting a master device among a plurality of devices in the managed computer network system.

4. The method according to claim 3, wherein the step of selecting the master device further comprises:
    specifying a mediation group among the plurality of devices, wherein the mediation group includes at least two devices; and
    selecting one of the plurality of devices of the mediation group as the master device.

5. The method according to claim 1, wherein the managed computer network includes a network manager configured to store the MIB corresponding to the device, the MIB including a plurality of entries, each of the entries including a plurality of objects, the method further comprising:
    repeating the steps of transmitting and receiving with the device, for each of the plurality of entries;
    creating a list of maximum numbers of objects that corresponds to each entry in the management information base for the device; and
    modifying communications with the device for each entry according to the corresponding maximum numbers of objects from the device, thereby substantially preventing firewall generated communication losses in the managed network system.

6. The method according to claim 1, wherein the step of limiting communications through the firewall in the managed computer network system comprises:
    recording whether a response to the status inquiry command has been received from the device;
    determining that if a response has been received from the device that the quantity of objects received correlates to a condition of no communication failure;
    determining that if no response has been received from the master device, a new status inquiry command is to be transmitted to the master device, wherein the new status inquiry command requests a second quantity of objects from the master device, wherein the second quantity of objects is less than the first quantity of objects, and repeating the steps of transmitting new status inquiry commands with a fewer quantity of objects until the quantity of objects received is substantially similar to the quantity of objects requested, wherein the quantity of objects received correlates to a condition of no communication failure.

7. The method according to claim 1, further comprising:
    selecting the status inquiry command from a group consisting of a GetRequest command and a GetNextRequest command.

8. The method according to claim 1, wherein the firewall generated communication loss comprises a firewall denial of service communication loss.

9. The method according to claim 1, wherein the firewall generated communication loss comprises a firewall JumboFrame communication loss.

10. A system for substantially preventing firewall generated communication losses in regard to communications by authorized users in a managed computer network, the system comprising:
    a Simple Network Management Protocol (SNMP) managed device having a unique Management Information Base (MIB);
    a firewall; and
    an SNMP network manager configured to transmit one or more status inquiry commands to the SNMP managed device, wherein the status inquiry command requests a first quantity of objects from the SNMP managed device, receives objects in response from the SNMP managed device to determine a maximum number of objects that can be successfully retrieved, and limits communications through the firewall in the managed computer network with the device to the determined maximum number of objects received from the device based upon a particular entry in the MIB.

11. The system according to claim 10, wherein the SNMP network manager is further configured to correlate a packet size to the received determined maximum number of objects from the device.

12. The system according to claim 10, wherein the SNMP network manager is further configured to select a master device among a plurality of devices in the managed computer network.

13. The system according to claim 12, wherein the SNMP network manager is further configured to specify a mediation group among the plurality of devices, wherein the mediation group includes at least two devices and to select one of the plurality of devices of the mediation group as the master device.

14. The system according to claim 10, wherein the managed computer network further comprises:
    a network manager configured to store the MIB corresponding to the device, and wherein the MIB is configured to store a plurality of entries, each of the entries including a plurality of objects, and wherein the SNMP network manager is configured to repeat transmitting and receiving with the device, for each of the plurality of entries, the SNMP network manager is configured to create a list of received maximum numbers of objects that corresponds to each entry in the MIB for the device, and the SNMP network manager is configured to modify communications with the device for each entry according to the corresponding maximum number of objects from the device, thereby substantially preventing firewall generated communication losses in the managed network system.

15. The system according to claim 10, wherein the SNMP manager is configured to record whether a response to the status inquiry command has been received from the device, the SNMP manager is configured to determine that if a response has been received from the device that the quantity of objects received correlates to a condition of no communication failure, and to determine that, if no response has been received from the master device, a new status inquiry command is to be transmitted to the master device, wherein the new status inquiry command requests a second quantity of objects from the master device, wherein the second quantity of objects is less than the first quantity of objects, and to repeat the steps of transmitting new status inquiry commands with a fewer quantity of objects until the quantity of objects received is substantially similar to the quantity of objects requested, wherein the quantity of objects received correlates to a condition of no communication failure.

16. The system according to claim 10, wherein the status inquiry command is selected from a group consisting of a GetRequest command and a GetNextRequest command.

17. The system according to claim 10, wherein the firewall generated communication loss comprises a firewall denial of service communication loss.

18. The system according to claim 10, wherein the firewall generated communication loss comprises a firewall JumboFrame communication loss.

19. A non-transitory computer readable medium including a program for substantially preventing firewall generated communication losses in regard to communications by authorized users in a managed computer network system comprising:

computer program code that transmits a status inquiry command to a device in the managed computer network system having a unique Management Information Base (MIB), wherein the status inquiry command requests a maximum number of objects from the device;

computer program code that receives objects from the device to determine the maximum number of objects that can be successfully retrieved; and computer program code that limits communications through the firewall in the managed computer network system with the device to the determined maximum number of objects received from the device based upon a particular entry in the MIB.

20. A Simple Network Management Protocol (SNMP) managed computer network system for substantially preventing firewall generated communication losses in regard to communications by authorized users in the SNMP managed computer network system, the SNMP managed computer network system comprising:

a SNMP managed device having a unique Management Information Base (MIB); a firewall; and an SNMP network manager configured to transmit one or more status inquiry commands to the SNMP managed device, wherein the status inquiry command requests a maximum number of objects from the SNMP managed device, and receives objects from the SNMP managed device to determine the maximum number of objects that can be successfully retrieved, and limits communications through the firewall in the SNMP managed computer network system with the device to a determined maximum number of objects received from the device based upon a particular entry in the MIB.

* * * * *